United States Patent [19]
Davis et al.

[11] 3,741,329
[45] June 26, 1973

[54] CHASSIS SUSPENSION ON VEHICLE FRAME

[75] Inventors: Owen K. Davis, Waukesha; Robert C. Haupt, Milwaukee; Kenneth N. Hansen, Waukesha; Michael L. Slosiarek, Milwaukee, all of Wis.

[73] Assignee: Allis-Chalmers Manufacturing Company, Milwaukee, Wis.

[22] Filed: May 18, 1971

[21] Appl. No.: 144,420

[52] U.S. Cl. ..... 180/89 R, 280/106.5 R, 280/150 C, 280/400, 280/461 A, 296/35 R
[51] Int. Cl. ........................................... B62d 33/06
[58] Field of Search ..................... 296/35 R, 28 C; 280/106.5 R, 405 B, 461 A, 460 A; 267/34; 180/89 R

[56] References Cited
UNITED STATES PATENTS

| | | | |
|---|---|---|---|
| 2,138,114 | 11/1938 | Nelson | 296/35 R |
| 2,708,133 | 5/1955 | Sewelin et al. | 296/35 R |
| 2,715,041 | 8/1955 | Fierbaugh et al. | 296/35 R |
| 3,097,879 | 7/1963 | Looper | 296/35 R |
| 3,420,568 | 1/1969 | Henriksson et al. | 296/35 R |
| 3,420,313 | 1/1969 | Walberg et al. | 280/405 B |

FOREIGN PATENTS OR APPLICATIONS

| | | | |
|---|---|---|---|
| 1,215,615 | 11/1959 | France | 280/106.5 |
| 709,770 | 8/1941 | Germany | 296/35 R |
| 1,209,144 | 1/1966 | Germany | 267/34 |
| 926,834 | 5/1963 | Great Britain | 296/35 |

*Primary Examiner*—Leo Friaglia
*Assistant Examiner*—John A. Pekar
*Attorney*—Arthur L. Nelson, Charles L. Schwab and Robert B. Benson

[57] ABSTRACT

A suspension system including a vehicle main frame mounted unsprung on a plurality of wheels carrying a spring suspended chassis defining an operator station and engine hood for dampening vibration and shock transmitted from the frame to the chassis.

10 Claims, 9 Drawing Figures

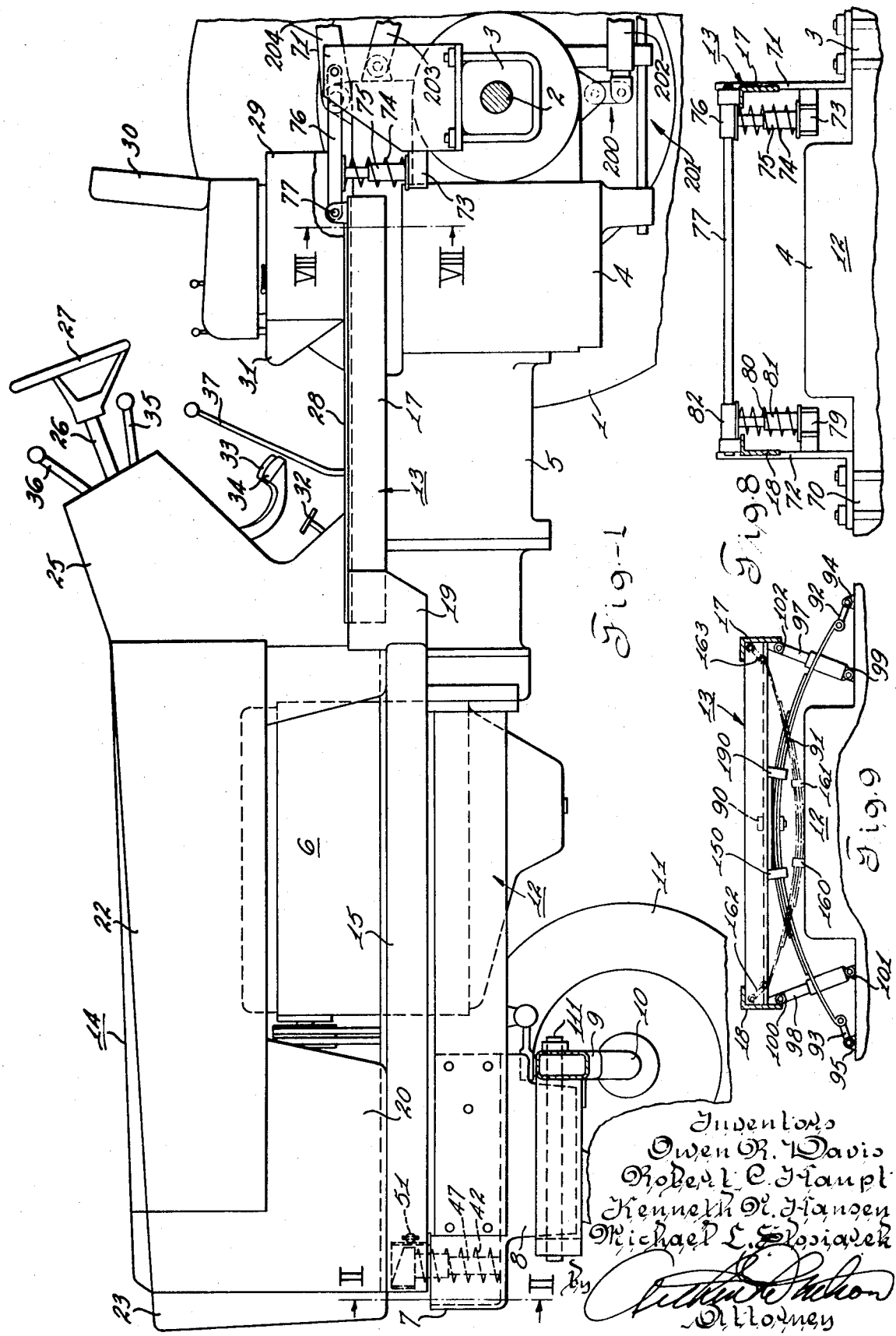

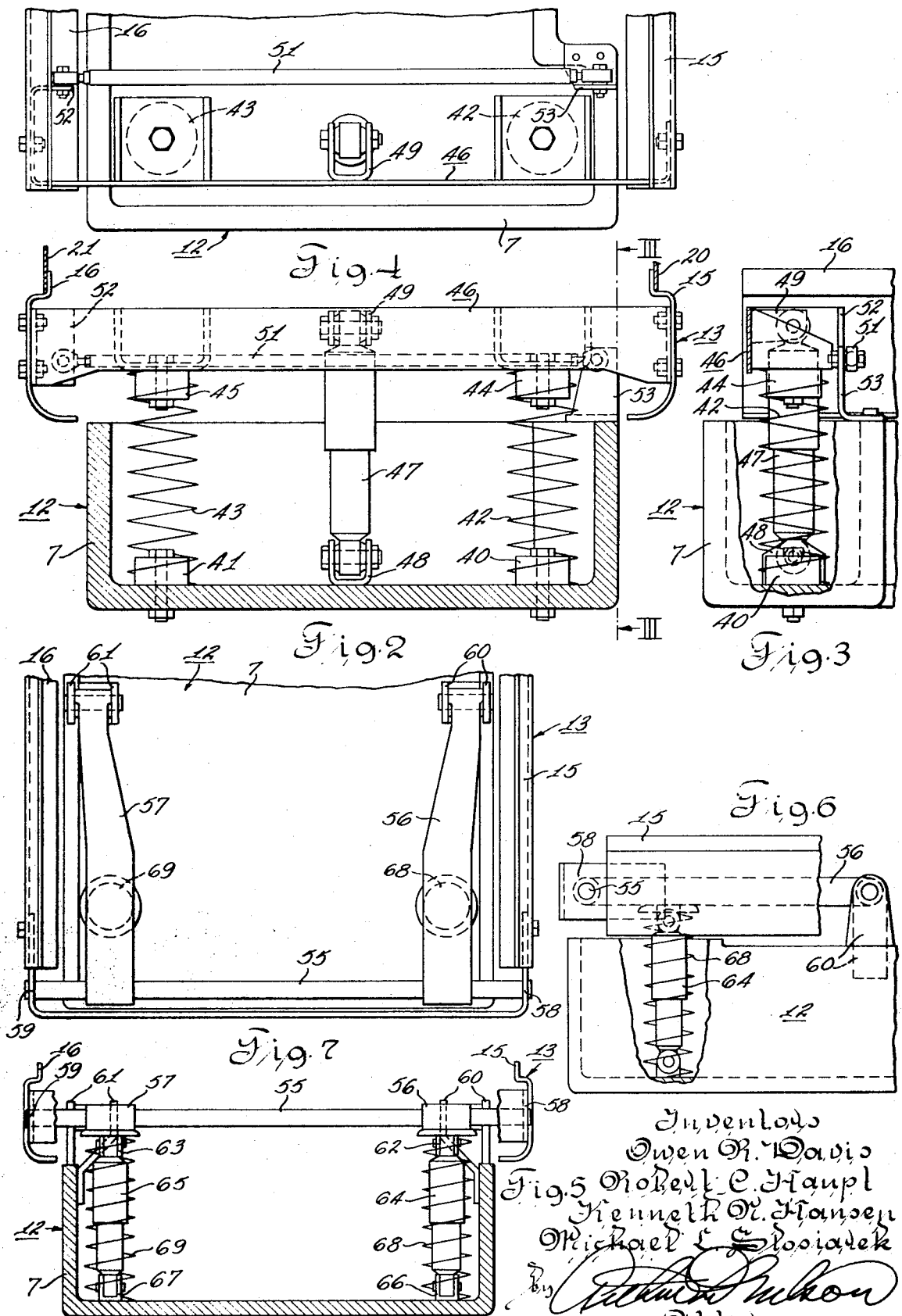

CHASSIS SUSPENSION ON VEHICLE FRAME

This invention relates to a suspension system and more particularly to a suspension system on a vehicle main frame supporting a chassis of substantial mass including the operator station which is thereby isolated from shock and vibration ordinarily transmitted from the main frame to the chassis.

The conventional tractor is primarily designed to deliver a predetermined draft load. Although the work output is a very real consideration, the human element is beginning to receive more consideration because it has been learned that the capabilities and limitations of the operator, in many instances, are affected by the degree of comfort, convenience and fatigue reducing considerations in the design. With the increased speed, size and power output of the tractor, the operator is being subjected to higher degrees of shock, noise and vibration while controlling more functions in larger implements at a faster event cycle. The endurance limits of the operator are therefore being reached. Accordingly, more time and research are being devoted to designs which will reduce operator fatigue.

A larger operator station and improved cushions and seat supports have been used on the more modern tractors. Also consideration is being given to the amount of force required for steering of the vehicle and the convenience of positioning of the control levers. While these improvements do help as a matter of convenience and comfort for the operator, further improvements are required to extend the productivity of the man-machine combination. The greatest need for improvement appears to be in reduction of shock transmitted to the operator and reduced relative motion between the operator on sprung seat suspension and adjacent features of the operator station, including platform and control devices.

The conventional automobile is designed for greater comfort of the operator than the conventional tractor, and there is much less relative motion between operator and controls on an automobile as it traverses rough terrain conditions. However, to design a tractor along these basic theories is not fully practical. A tractor must provide a base support for the implement which is being drawn by the tractor in order to regulate the level and depth of the implement during its operation and also for controlling the positioning of the implement durings its transport mode. Accordingly, it is impractical to have a sprung suspension system between the wheels and the body of the vehicle, as is used in automobile designs.

Accordingly, this invention provides a main frame of the vehicle which is mounted unsprung on the wheels, and generally follows the contour of the terrain. The main frame provides a base for supporting the implement during its operating or transport modes. The mass of the main frame generally includes the engine, transmission, rear drive assembly, rear axles and wheels which is sufficient to support the implement for controlling its level and position for the desired operation.

A suspension system is mounted on the main frame supporting the chassis. The suspension system consists essentially of a plurality of springs which provide resilience between a main frame and the chassis. The suspension system also includes shock absorbers for reducing the shock and vibration transmitted to the chassis. The chassis defines an operator station including the platform, fenders, instrument panel, seat, steering wheel and other control devices and extends forwardly to carry the engine hood including a plurality of sheet metal parts which normally generate and transmit noise when the engine is running and the vehicle is in operation. When the platform and operator station is so isolated, the operator can stand up to operate the vehicle without being subjected to shock transmitted through the platform, as in conventional vehicles. With the portion of the tractor normally within the field of view of the operator moving in unison the operator gains a feeling of stability and complete control in operating the vehicle.

A further sophistication of the suspension system includes a torsion bar or a sway bar to prevent swaying and tilting and general instability of the chassis relative to the main frame. Accordingly, the system will provide suspension of the chassis on the main frame which is a compromise between the conventional tractor design and the automobile design, while maintaining the main frame as the supporting structure for the implement to control its height, level and operation while yet maintaining sufficient mass which is integral with the seat and the platform and other related parts which form the operator station for a comfortable ride. The control levers are connected through flexible elements to allow the levers and steering wheel and all related controls associated with the operation of the vehicle to move with the operator to give the operator a feeling of security and make the controls readily available regardless of the position of the frame on the tractor as it moves over the terrain.

Accordingly, it is an object of this invention to provide a vehicle chassis including an operator station and extending forwardly to support the engine hood mounted on a main frame supported suspension system including springs and shock absorbers to isolate the operator station from shock and vibration ordinarily transmitted from the main frame to the chassis of the vehicle.

It is another object of this invention to provide a vehicle chassis defining the operator platform, seat and the engine hood of the vehicle with all vehicle controls supported on the chassis having flexible connection to the servo-operators on the main frame whereby springs and shock absorbers on the main frame resiliently support the chassis to isolate the chassis from the main frame.

It is a further object of this invention to provide a main frame carried unsprung on a plurality of wheels generally following the contour of the ground and defining base of support for the implement operated from the tractor. A chassis defining substantial mass including a platform, fenders, instrument panel, seat, a steering column and wheel, control levers, and an engine hood is mounted on springs and shock absorbers carried by the main frame to reduce road shock, noise and vibration at the operator station.

The objects of this invention are accomplished by supporting the main frame of the vehicle unsprung on the wheels. The chassis is suspended on the main frame by a full suspension system, including springs and shock absorbers. The chassis and engine hood being so mounted will produce or transmit less noise than that experienced with the currently conventional rigid mounting of these sheet metal components, particularly when the engine is running at high speeds. Suitable sway bars or torsion bars are also employed to prevent tilting and provide stability of the chassis relative to the main frame. Accordingly, the vehicle chassis defines the operator station and includes all the control levers required to control the operation of the vehicle, and the operator is isolated from vibration, shock and noise which is inherent in the conventional type draft vehicle.

Referring to the drawings, the preferred embodiments of this invention are illustrated.

FIG. 1 illustrates a side elevation view of the tractor with two wheels removed and a section cut through the rear drive axle and the front axle to more clearly show the relative position of the various components on the tractor.

FIG. 2 illustrates a cross section view taken on line II—II of FIG. 1.

FIG. 3 is a fragmentary side view taken on line III—III of FIG. 2 showing the relationship of the suspension system with the frame and chassis.

FIG. 4 is a fragmentary plan view showing the related components of the front end suspension system as shown in FIG. 2.

FIG. 5 is a view of a modification of the front end suspension system between the main frame and the chassis similar to the view as shown in FIG. 2.

FIG. 6 is a fragmentary side view showing the relationship of the components of the side of FIG. 5.

FIG. 7 is a fragmentary plan view of FIG. 5 showing the relationship of the components in the plan view.

FIG. 8 is a fragmentary cross section view taken on line VIII—VIII of FIG. 1.

FIG. 9 is a view of a modification of the suspension system which may be used in the front or rear of the vehicle.

Referring to the drawings, FIG. 1 illustrates the side elevation view with a front and a rear wheel removed to more clearly illustrate the suspension system of the vehicle. The right rear wheel 1 is shown in position on the tractor and is driven by a drive shaft similar to the left hand drive shaft 2. The rear axle sleeve 3 is integral with the rear drive housing 4. The rear drive housing 4 is connected to the transmission 5 which is connected to the engine 6. The engine 6 and the transmission 5 are also integral with the front support 7. The support 7 defines a bracket 8 which is pivotally connected to the front axle 9. The front axle 9 supports a spindle 10 for supporting a front wheel 11. The front axle 9 pivots on the pin 111 as the front wheels travel over terrain.

For the purpose of illustration the support 7 and the engine together with the transmission rear drive assembly and rear axles will be considered the main frame 12 which defines the base for supporting the implement and controlling its level or position when in operation or in transport. The main frame 12 supports the drawbar assembly 201 and the 3-point hitch 200 for controlling the implement. The 3-point hitch 200 includes a pair of lower draft arms 202 and an upper link 203 for connection to the mast of an implement. The rock arms 204 are connected to a rock shaft and on their outer ends through lift links to the lower draft arms 202 for raising and lowering of the implement. Accordingly, the main frame provides a support for the hitching means for positioning and controlling the movement of the implement.

The main frame 12 provides a support for the suspension system which supports the chassis 13. The chassis 13 includes the engine hood 14 and channels 15 and 16 which extend rearwardly for connection to the side beams 17 and 18. The channel 15 is fabricated to the side beam 17 by the bracket 19 while the channel 16 is fabricated to the side beam 18 by a similar symmetrical bracket not shown. Channel 15 supports the side panel 20 while the channel 16 supports the side panel 21. The panels 20 and 21 extend upwardly to connect to the top panel 22 and extend forwardly to provide an assembly with the grill 23. The engine hood 14 is connected to the shroud 25 which carries the steering column 26 supporting the steering wheel 27, the pedal controls and instruments.

The side beams 17 and 18 support the platform 28 which in turn supports a boxlike structure 29 for supporting the seat 30. The control panel 31 is positioned on the side of the seat 30 for convenience to the operator and is supported on the platform 28. The throttle lever 32, brake lever 33, and clutch lever 34 are all supported on the chassis. The hand throttle 36 and the range selector lever 37 and/or power shift transmission lever 35 are also supported on the chassis. The levers and controls are connected by suitable flexible connections to the servo-operator on the main frame of the vehicle. Such flexible connectors as hydraulic hoses, wires and cables provide connection between the chassis and the main frame which supports the servo-operators such as hydraulic actuators. Reference may be had to the copending patent application Ser. No. 144,451, filed May 18, 1971, of the same assignee for a more detailed description of the flexible connections.

Referring to FIG. 2, the main frame 12 supports the spring retainers 40 and 41 supporting the springs 42 and 43. Spring retainers 44, 45 are positioned on the cross member 46 which is connected to the channels 15 and 16 of the chassis. The shock absorber 47 is pivotally connected to the bracket 48 on the main frame 12 and the bracket 49 on the cross member 46 of chassis 13. The sway bar 51 is pivotally connected to the mounting bracket 52 on the chassis 13 and extends transversely to pivotally connect to the bracket 53 on the main frame 12. Accordingly, the front end suspension consists of two springs spaced transversely relative to each other for supporting a chassis 13 on the main frame 12 with a shock absorber 47 with a center location between the main frame 12 and the chassis and cross member 46 of the chassis 13. The sway bar prevents the instability of the chassis from shifting transversely while the single shock absorber eliminates shock and vibration transmission from the main frame 12 to the chassis 13.

Referring to FIGS. 5, 6 and 7 a modification of the front end suspension is shown wherein the torsion rod 55 integral with arm 56 and an arm 57 is pivotally mounted on bearings 58 and 59 respectively.

The arms 56 and 57 extend rearwardly and are pivotally connected to the brackets 60 and 61 on the main frame 12. The arms 56 and 57 also each carry a clevis 62 and 63 respectively which provides a means for connection to the shock absorbers 64 and 65. The lower end of the shock absorbers are connected through the clevises 66 and 67 on the main frame 12. Springs 68 and 69 respectively embrace the shock absorbers 64 and 65. Accordingly, the shock absorbers 64 and 65 together with the springs provide a suspension means for the dampening vertical vibrations and providing a resilient mount for the chassis 13 supported on the main frame 12. The torsion bar 55 further provides stability in that if one side of the vehicle is depressed the tendency is to maintain a stable nontilting position due to the torsion strain of the torsion bar 55 when one of the arms is angularly displaced relative to the other.

Although FIGS. 2, 3 and 4, as well as FIGS. 5, 6 and 7 illustrate the related parts of the suspension system on the front end, it is understood that the combinations as shown in the suspension system of these figures might also be adapted for use on the rear end of the vehicle body as well.

FIG. 8 is a fragmentary cross section as taken on line VIII—VIII of FIG. 1. The left hand axle sleeve 3 and the right hand axle sleeve 70 are connected to the rear drive housing 4. The axle sleeve 3 supports the bracket 71 while the axle sleeve 70 supports the bracket 72. The bracket 71 is integral with the flange 73 which supports the spring 74 and shock absorber 75. The upper end of the shock absorber 75 and spring 74 are connected to the arm 76 of torsion bar 77. The bracket 72 is integral with the flange 79 which supports the spring 80 and shock absorber 81. The spring 80 and shock absorber 81 are also connected to the arm 82 of the torsion bar 77. The torsion bar 77 is constructed similarly to the torsion bar 55 as shown in FIGS. 5, 6 and 7 and operates in the same manner. The suspension components as shown in FIG. 8 operate between the chassis 13 and the main frame 12, except that the components are positioned on the rear end of the chassis as contrasted to the FIGS. 5, 6 and 7, as illustrated, show suspension of the front end of the chassis.

FIG. 9 is a modification of suspension components wherein the sway bar 51 and the torsion bar 77 have been eliminated as a component of the suspension system. The chassis 13 is mounted above the main frame 12. The chassis 13 is connected by means of bolt 90 connected between the leaf spring 91 and the chassis 13 at an intermediate point on the chassis. The ends of the spring 91 are connected by shackles 92 and 93 to the main frame 12 by means of clevises 94 and 95. The leaf spring 91 operates as a stabilizing device as well as a spring to resiliently support the chassis 13 on the main frame 12. Any tendency of the chassis 13 to sway is counteracted by the stiffness of the leaf spring 91 as well as the shock absorbers 97 and 98 which are connected between the main frame 12 and the chassis 13. Shock absorber 97 is connected by the clevis 102 to the chassis 13 and the clevis 99 to the main frame 12. The clevis 100 on the chassis 13 is connected to the shock absorber on the upper end while the clevis 101 connects the shock absorber 98 on its lower end to the frame 12. This suspension mechanism is a simplified version and adapts itself well to front end suspension, although it might be used for rear end suspension of the chassis. It is understood that the suspension of the chassis requires at least three points to maintain a level condition of the chassis relative to the main frame. Four points of support provide greater stability, however, three point systems have been used on vehicles to provide reasonably good stability. It is understood that the center portion of the leaf spring 91 is connected to the chassis 13 by brackets 50 and 190 to limit movement between the spring and the chassis to maintain stability of the chassis relative to the main frame 12. The spring 160 shown in phantom is supported on blocks 160 and 161. The shackles 192 and 193 connect the spring 160 to the chassis 13. This modification shows an alternate suspension means supporting the chassis.

The preferred embodiments of this invention will be described in the following paragraphs.

Referring to FIG. 1, the rear suspension system employs a pair of shock absorbers 75 and 81 under the chassis 13. The springs 74 and 80 provide the resilience to dampen transmission of vibration and shock as produced on the main frame 12 when the engine is in operation and when the transmission is driving the vehicle over rough terrain. All vibration cannot be transmitted directly through a spring since the resilience of this spring dampens the amplitude of vibration. Sudden shock which is produced on the main frame 12 is also reduced and dampened by the shock absorbers 75 and 81 which reduce the amplitude of the shock force. The torsion bar 77 provides a stability of the vehicle chassis relative to the main frame when one corner of the chassis is depressed relative to the other corner of the rear end of the vehicle. The torsion bar tends to depress the opposite side and stores kinetic energy which tends to reduce the effect of the force applied on the side of the frame being depressed. The tendency is to maintain stability of the rear end of the chassis by overcoming the unstabilizing force and tends to return the suspension system to its normally level position relative to the main frame 12.

Referring to FIGS. 2, 3 and 4, the front suspension system similar to the rear suspension system shown in FIG. 8 will be described. Although two coil springs 42 and 43 are positioned in transversely spaced location, only a single shock absorber 47 is used in the center position. The single shock absorber will create a greater tendency to sway laterally about the shock absorber connection, however, the sway bar 51 resists transverse movement of the chassis relative to the frame. The chassis 13 can pivot slightly but the rearmost portion of the suspension system also resists a pivoting of the chassis around the connections of the shock absorber. The total effect is to restore the chassis to its normal position by the force of the resilient springs 42 and 43 and any sudden shock is overcome by the shock absorber 47, while the sway bar 51 maintains stability of the chassis by resisting transverse movement of the chassis 13 relative to the main frame 12.

FIGS. 5, 6 and 7 disclose a modification for the front end suspension which operates in a manner similar to that described for FIG. 8. This type of a system combined with the system as shown in FIG. 8 provides a more stable arrangement for vehicle suspension.

A modification of the suspension system eliminates either the torsion bar 77 or 55 or the sway bar 51 as shown in FIG. 9. This system operates with a single leaf spring 91 which is connected to the intermediate portion of the chassis 13 and connected by shackles 92 and 93 to the main frame 12. The inherent stiffness of the spring 91 resists a transverse movement of the chassis relative to the main frame while the shock absorber resists sudden vertical movement of the chassis 13 relative to the main frame. This system adapts itself well to a front end suspension having a chassis of this type in that the components are relatively inexpensive to manufacture and require relatively few components as compared to the other two systems.

It is understood that one advantage of a suspension system, as shown, will be to provide a convenient means of completely removing the chassis from the main frame which permits access to the vehicle engine or transmission for repair. This would permit removal of the engine or the transmission with ease when the chassis is removed from the vehicle. It also provides a substantial mass which defines the operator station and all the controls necessary to operate the vehicle as well as isolating the sheet metal portions of the shroud and engine hood which have a tendency to rattle when the vehicle is in operation. Accordingly, the suspension system provides a base frame 12 for supporting, controlling and positioning of the implement for ideal operation while isolating the operator from vibration, shock and noise which is inherent with the conventional type of tractor.

The embodiments of the invention in which an exclusive property or privilege is claimed are defined as follows:

1. A tractor comprising, a main frame including an engine and drive assembly mounted unsprung on a plurality of wheels for following the contour of the terrain, means for attaching and controlling implement position, a vehicle chassis substantially the length of the vehicle defining substantial mass including an operator platform and seat, a steering wheel and control levers for controlling the operation of said vehicle, and an engine hood integral with the forward end of said chassis, said chassis including a structure providing rigidity to said chassis, a suspension system including a plurality of springs connected to the front portion and rear portion of said main frame at laterally spaced points and connected to said chassis to support said chassis in a level position, a plurality of shock absorbers connected between said main frame and said chassis for reducing transmission of shock and vibration from said frame to said chassis and thereby improve the ride and reduce the noise level at the operator station during operation of the vehicle.

2. A tractor as set forth in claim 1 wherein said suspension system includes at least one torsion bar having radially connected arms integral with said bar, means connecting said bar and said arms between said main frame and said chassis to reduce lateral sway of said vehicle when in operation.

3. A tractor as set forth in claim 1 wherein said suspension system includes at least one sway bar connected between said main frame and said chassis to stabilize said chassis against lateral swaying when said vehicle is in operation.

4. A tractor as set forth in claim 1 wherein said suspension system includes a shock absorber positioned at each corner of said chassis to thereby reduce transmission of vibration and shock from said main frame to said chassis.

5. A tractor as set forth in claim 1 wherein said suspensions system includes two coil springs positioned at the forward end and two coils positioned at the rearward end of said chassis with each coil spring positioned transversely relative to the longitudinal center of said vehicle to thereby provide spring suspension on the four corners of said vehicle chassis.

6. A tractor as set forth in claim 1 wherein said springs include a leaf spring on the forward end and coil springs on the rearward end of said vehicle for connection to said main frame at points transversely of a longitudinal axis of said frame to provide a resilient support for said chassis on said main frame.

7. A tractor as set forth in claim 1 wherein said suspension system includes two springs on the forward end of said chassis laterally spaced relative to each other, one shock absorber positioned on the longitudinal center of said chassis at the front of said vehicle to thereby provide resilient suspension and shock absorption between said main frame and said chassis.

8. A tractor as set forth in claim 1 wherein said suspension system includes a torsion bar integral with a pair of radially extending arms, means pivotally connecting one end of said arms with said frame and means pivotally connecting the other end of said arms with said chassis, a coil spring embracing a shock absorber positioned on at least one end of said chassis with said spring and shock absorber positioned on each side of the longitudinal center of said chassis, means connecting said spring and shock absorber to said chassis, means connecting said spring and shock absorber to said arms to thereby stabilize the chassis against rolling when vehicle is in operation.

9. A tractor as set forth in claim 1 wherein said suspension system includes at least two shock absorbers and two springs positioned on said main frame and connected to said chassis at points transversely spaced relative to each other, a sway bar connected between said main frame and said chassis to stabilize said chassis against the swaying movement when said vehicle is in operation.

10. A tractor as set forth in claim 1 wherein said suspension system includes at least one leaf spring mounted transversely to the longitudinal axis of said main frame with said leaf spring connected to said chassis and said frame, a shock absorber connected at each end of said leaf spring between said chassis and said frame to thereby provide resilient suspension of said chassis and shock absorbing means to dampen vibration and shock transmitted from said main frame to said chassis on said vehicle.

* * * * *

PO-1050
(5/69)

UNITED STATES PATENT OFFICE
CERTIFICATE OF CORRECTION

Patent No. 3,741,329  Dated June 26, 1973

Inventor(s) Owen R. Davis, Robert C. Haupt, Kenneth N. Hansen and Michael L. Slosiarek It is certified that error appears in the above-identified patent and that said Letters Patent are hereby corrected as shown below:

After Inventors:, "Owen K. Davis" should read --- Owen R. Davis ---;

Column 7, Claim 1, line 22, cancel "a steering wheel and control levers" and substitute --- control means ---.

Signed and sealed this 5th day of March 1974.

(SEAL)
Attest:

EDWARD M. FLETCHER, JR.
Attesting Officer

C. MARSHALL DANN
Commissioner of Patents